United States Patent [19]

Moll et al.

[11] 3,989,848

[45] Nov. 2, 1976

[54] METHOD OF MASHING FOR THE PRODUCTION OF WORT AND APPARATUS FOR THE CARRYING OUT OF THIS PROCESS

[76] Inventors: Manfred Moll, 13ter rue de Houdemont, 54500 Van Doeuvre; Michel F. Bastin, 4551 tour Panoramique, 54100 Nancy; Bruno Peters, 8 rue des Bateleurs, 54410 vandiveirlle-duont-Nancy, all of France

[22] Filed: Nov. 29, 1974

[21] Appl. No.: 528,239

[30] Foreign Application Priority Data
Nov. 29, 1973 France ............................ 73.43301

[52] U.S. Cl. ................................. 426/30; 99/278; 195/141
[51] Int. Cl.² .......................................... C12C 7/04
[58] Field of Search ............... 426/28, 29, 30, 7, 18, 426/11, 16; 49/278, 276–277; 195/139, 142, 140, 141

[56] References Cited
UNITED STATES PATENTS

| | | | |
|---|---|---|---|
| 2,894,841 | 7/1959 | Compton et al. ..................... | 426/30 |
| 3,082,090 | 3/1963 | Dummett et al. ..................... | 426/30 |
| 3,743,582 | 7/1973 | Kitai et al. ..................... | 195/142 X |

*Primary Examiner*—A. Louis Monacell
*Assistant Examiner*—R. B. Penland
*Attorney, Agent, or Firm*—Robert E. Burns; Emmanuel J. Lobato; Bruce L. Adams

[57] ABSTRACT

A continuous mashing process for producing wort in the production of beer comprises providing a mash mixture of malt and raw grains; continuously flowing the mash mixture through a mash reactor; and heating the mixture during its flow through the reactor to progressively raise the temperature of the mixture at an almost constant temperature gradient from approximately 30° C at the reactor inlet end to approximately 80° C at the reactor outlet end to thereby form mash. During its flow through the reactor, the mixture is agitated in a controlled manner to effectively prevent overheating thereof and facilitate the extraction and diffusion of the active ingredients in the mixture, and the agitation is carried out so as to prevent back-flow of the mash within the reactor. The mash is then filtered to produce wort.

A mash reactor comprises a plurality of chambers connected together in serial flow relationship with one end chamber having an inlet for receiving a mash mixture and the other end chamber having an outlet for discharging the mash. An agitator extends axially through the chambers and is provided with means located in the vicinity of the constricted passages between adjoining chambers for assisting and promoting flow in the forward direction and preventing flow in the reverse direction. For example, the agitator may have helical screw sections located in the constricted passages, or the agitating blades may be located proximate the constricted passages, or a one-way valve may be provided at each constricted passage. Heating jackets surround the chambers and preferably have a triangular cross-section which complements the profile of the chambers to provide large heat-exchange surfaces.

15 Claims, 7 Drawing Figures

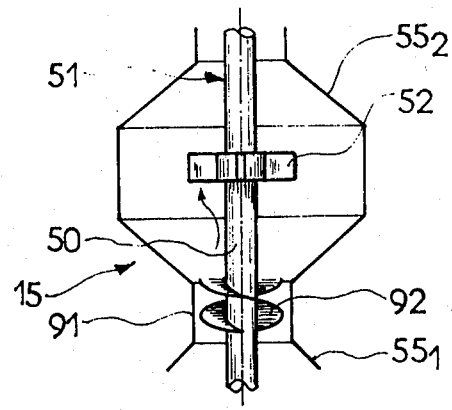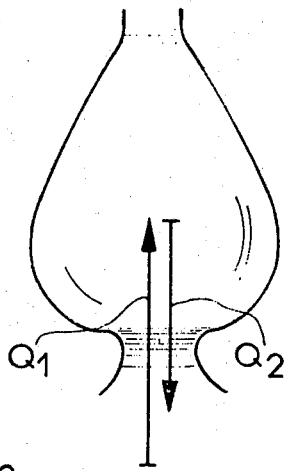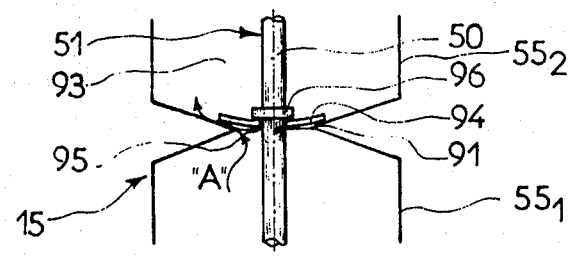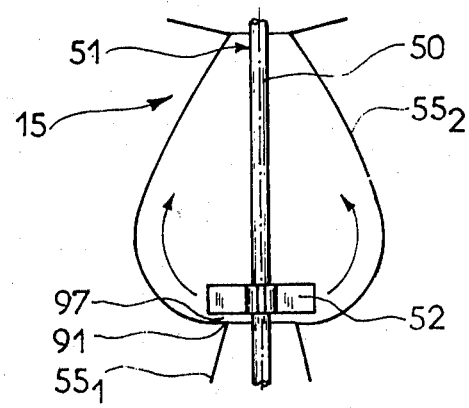

METHOD OF MASHING FOR THE PRODUCTION OF WORT AND APPARATUS FOR THE CARRYING OUT OF THIS PROCESS

The present invention relates on the one hand to a method of mashing for the production of wort and on the other hand to an apparatus for the carrying out of this method.

Various methods of mashing for the production of wort and especially for the production of beer are already known. These methods may be generally classified in two groups — the first comprising the so-called "conventional method" and in particular the methods of batch mashing and the second comprising the continuous mashing methods.

In these methods the malt is subjected to a given treatment and the unmalted grains such as rice, corn, barley and others to a different treatment which can be effected only with the assistance of the addition of a portion of the malt mash or of enzymes from an external source. For each particular type of mashing raw material, that is to say the malt and the unmalted grains, a given saccharification diagram is used. For this purpose, in order to bring about a given action of the enzymes, it is necessary to increase the temperature, the latter rising from 45° C to 75° C. However, this increase in temperature takes place with pauses and in general there are three such pauses. The first pause, of a given duration, occurs at a temperature of about 45° C. During this pause the proteolysis of the treated product takes place. After this time, the temperature is brought to a value of about 65° C. During this second pulse, which is of a given duration, the beta-amylase acts. The temperature is then raised to the vicinity of 75° C. to cause the action of the alpha-amylase. The total time of mashing, up to the saccharification of the mash, obtained by increase of the temperature with pauses in an apparatus operating in batch-wise fashion is between 120 and 140 minutes.

The conventional mashing appears to be governed by severe operating requirements in particular with respect to the time-temperature diagram, the grinding of the malt, and the mandatory nature of a separate treatment of the unmalted gains.

On the other hand, it does not appear that the mashing industry is engaged on a truly large scale in the continuous production of wort nor that the intrinsic problems of continuous operation in the case of malting have been entirely understood or solved.

The production of the wort in continuous operation has numerous advantages, among which mention may be made of the following:

for equal production, smaller vessel size as the vessels would be operating permanently under full load, as smaller well as transit and transfer apparatus which would then be dimensioned on basis of a constant average rate of flow instead of being dimensioned on basis of the peak value of an equivalent intermittent rate of flow;

a heat recovery which is facilitated and more complete to the extent that the heat diffuses spontaneously without waiting the intermittent times of its recovery;

the possibility of including in a continuous process a series of actions which are better adapted to the local and instantaneous requirements and interests of the natural processes along the path of the materials;

a reduction of the operating expenses due to the fact that the present sequence of conditions and operations is replaced by a three dimensional succession of operating conditions along the process, which succession is constant in time and therefore requires less attention.

These advantages of the continuous method are only obtainable at the cost of an intrinsic drawback, namely:

the treatment undergone by the mash is not uniform due to the fact that portions or fractions thereof pass through the apparatus at different times or even along different paths, only the average of which can be imposed.

It is therefore fundamental in order to obtain the advantages indicated that a compromise be made between the requirements of the natural processes and the implications of continuous operation.

This is possible, on the one hand, by reducing to what is strictly necessary the requirements which are assumed imposed by the natural processes and, on the other hand, by the design of the process and the selection of the apparatus employed to reduce the disparity in the treatments whose coexistence is inevitable so that they all fall within the scope of the limits imposed.

In this connection it has been found:

that the natural process, for its proper operation, requires a reduction of the superheatings due for instance to the temperature gradient in the boundary layer adjoining the heating wall so as not to harm the enzymatic potential before the transformations incumbent upon it have been accomplished. With this precaution, obtained by imposing a sufficiently vigorous and uniform agitation of the mash and using a sufficiently high ratio of heating surface to volume to be heated so as to reduce the superheatings to a few degrees Centigrade, the mashing can lead to its end of extraction and saccharification within a time of about 1 hour.

that the mashing process supply a wort of satisfactory characteristics on basis of the preceding conditions for greatly different "time-temperature" diagrams even if one substantially varies from the shapes of curves used in current practice. It would appear that the main variable is the total time of treatment which determines its exhaustiveness in accordance with conditions which depend, of course, on the quality of the malt, the ratio of crushed malt to water and the particle size.

that in particular a direct increase, without pause, of the mashing temperature, to the temperature of about 70° to 80° C, at the end of the saccharification, provides a result which, with respect to mashing yield, is comparable to that of mashing with the conventional pauses and this is accomplished within a period of time of about 1 hour for the malt.

that upon mixing directly the malt and the total amount of unmalted grains, not previously treated, at about 100° C, the saccharification is obtained at the end of the rise in temperature without definite pauses at about 77° C and within a time of scarcely more than an hour.

that the loss of extraction and of fermentability, inherent in this practice and shown by the black discoloration of the mash by iodine if the temperature is then increased to about 100° C, can be reduced to an economically feasible value, in view of the substantial simplification of the process and the apparatus and the possibilities of recovery on the spent grains and recycling, by the use of a very fine crushing of the unmalted grains which increases the percentage of their volume accessible via the surface to the enzymatic action coming from the malt and by a suitable selection of the heat curve at the end of mashing.

These findings, to the extent that they show that the natural process tolerates a substantial range of variants with respect to the treatment undergone, are of such a nature as to justify continuous mashing despite its aforementioned brawback.

It should also be noted that the requirement relative to overheatings will be more easily satisfied in a continuous process in which the lengthening of the apparatus in the direction of travel is of such a nature as to favor the surface/volume ratio.

With regard to the other aspect of the compromise mentioned, namely the reducing by the design of the process and of the apparatus of the spectrum of treatments coexisting in a continuous mashing apparatus in accordance with the invention, recourse is had to the following means:

Vertical circulation to prevent the settling, aggravating the disparity in treatment and to obtain as uniform a distribution as possible of the net velocities in the cross section of the apparatus.

Use of a reactor comprising a plurality of cells in series so as to reduce, by statistically defined compensation the "dispersion of the times of stay — average time of stay" ratio to a value definitely less than that which a single cell would give.

Configuration and operation of the agitator selected in such a manner as to impair this ratio as little as possible while satisfying the requirements of combatting settling and of assisting in the transfers of heat and mass which justify the agitation.

Design of the connecting passages between adjacent cells in such a manner as to reduce the "convective exchanges/net flow" ratio also in order to reduce the dispersion of the times of stay and of the treatments coexisting in the apparatus.

These measures, which will be described in further detail below, as well as other measures make it possible to optimize the compromise between the requirements of the natural processes and the implications of the continuous process.

It has been found that the residual loss of extract inherent in the most unfavorable individual treatments, namely those suffered by the portions or fractions of the mash which present the shortest time of transit in the mashing reactor could be greatly reduced and amount to only a few percent even for minimal times of stay of far less than one hour.

This residual loss can be further reduced also by an increase in the average times of stay and/or by technological measures which oppose the flow between chambers in direction opposite the direction of the net flow. Moreover, the greater the flow for which the apparatus is dimensioned the greater the ratio of the dimension of the cells to that of the transit orifice between them. As a matter of fact the size of the particles makes it necessary not to go below too small a diameter of the transit orifice. The higher the flow the higher will be the net speed in the constricted cross section and the more it will predominate over the turbulences which, in case of a small size, tend to create harmful exchanges between cells in direction opposite that of the net flow.

Finally, it should be noted that the generalizing of the recovery measures, particularly on the spent grains, tends to displace the economic optima of the primary operations towards poorer exhaustiveness. In particular, upon mashing, taking into account the upstream recycling of the spent-grain pressing liquors, it may become profitable to reduce the investment to the detriment of the exhaustiveness — up to now almost total — of the mashing operation.

In accordance with what has been set forth above, the present invention relates to a mashing process for the production of wort in which the malt and raw grains are crushed and mixed and at the end of the cycle a separation is effected, characterized by the fact that the materials pass through the apparatus in a continuous flow and undergo a treatment there which is spread over several stages of the apparatus, which preserves the potential of each enzymatic fraction by the exclusion of overheating at the wall, which treatment consists of a progressive increase in the temperature and a forced agitation which opposes settling and favors renewal at the points of reaction and exchange.

The invention also concerns an apparatus for the carrying out of the process, characterized by the fact that it comprises a mixer and at least one reactor operating continuously and being provided with an axial agitator, this reactor being composed of cells communicating in series which are arranged vertically and effect the operation in stages and equipped with heating jackets covering the greater portion of their surface so as to reduce the heat gradient in the mash due to the exchange of heat, these jackets being capable of being fed separately or in series with one or more sources of hot fluid to obtain different temperature profiles along the reactor.

The invention will be better understood by reference to the following description given by way of illustration and not of limitation and to the accompanying drawings in which:

FIGS. 4 to 6 represent variants in detail of the embodiments of the cells of the reactor and FIG. 7 is an explanatory diagram useful in explaining the principles of the invention.

Figure 1:
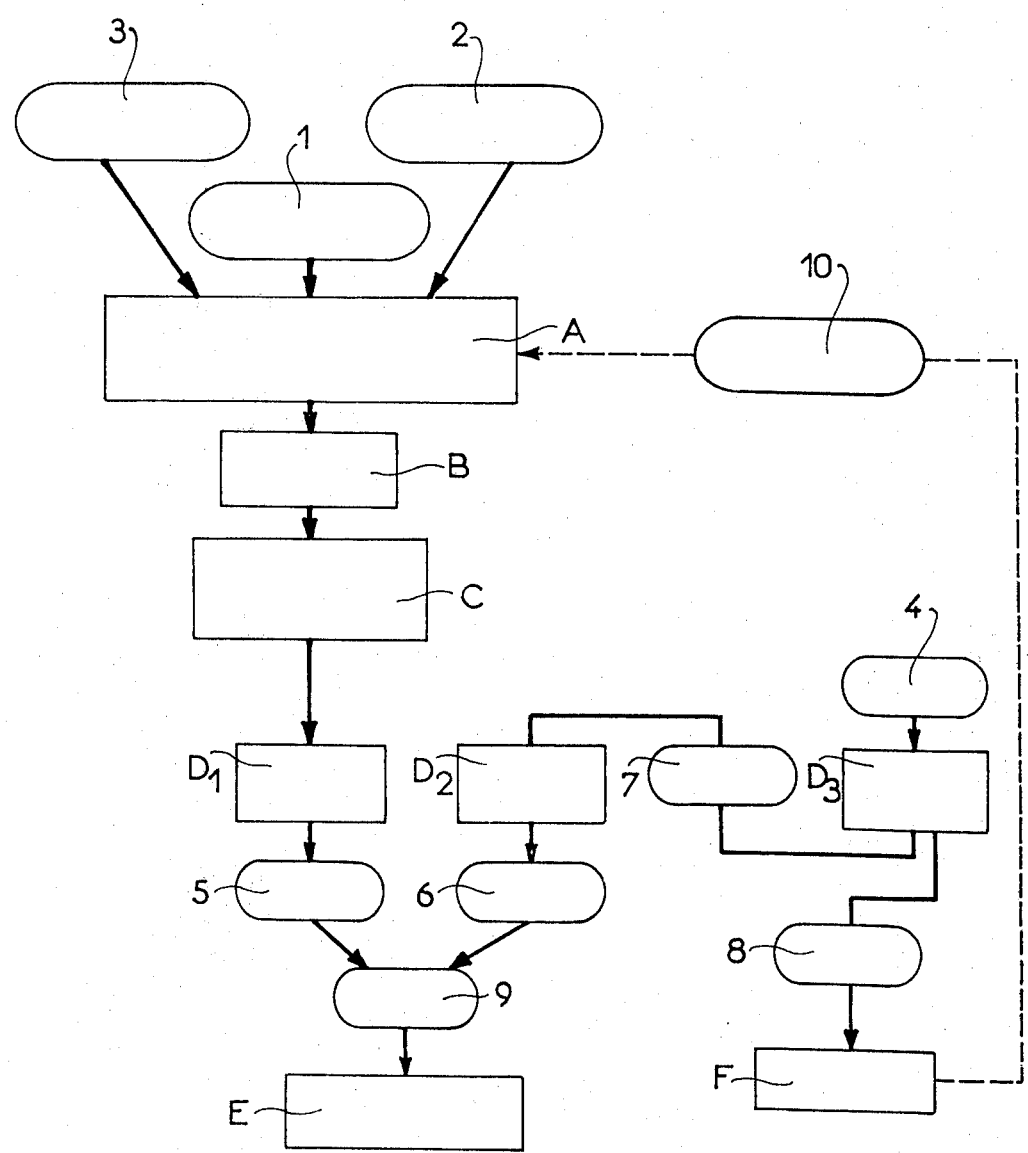
FIG. 1 is a block diagram of one of the variants of the process in accordance with the invention, namely that in which the treatment of the unmalted grains and of the malt is separate and common to these materials.

Reference will now be had to FIG. 1.

In a first phase "A" mashing water 1, malt in the form of normal crushed malt 2 and unmalted grains in the form of fine grinding 3 are continuously mixed together. After the mixing, the actions of the beta-glucanases and of the proteases commence at about 40° C. By means of a pumping unit "B" the mixture is transferred continuously from "A" into a mashing reactor "C" in which the temperature of treatment is progressively increased to about 77° C. This mash is directed towards a three stage continuous separation unit. The first stage "$D_1$" provides the first broth 5, the second stage "$D_2$" supplies the first sparging liquor 6 and the third stage "$D_3$" which, at the receives sparging liquor 4 separates and supplies the second sparging liquor 7 which is recycled to the second stage "$D_2$". After this third stage of separation it is possible by means of a retreatment "F" to extract a liquor 10 which can contribute to the mixing in "A". The first broth 5 and the sparging liquor 6 are combined to make the wort 9 which is subjected in "E" to a continuous treatment.

Figure 2:
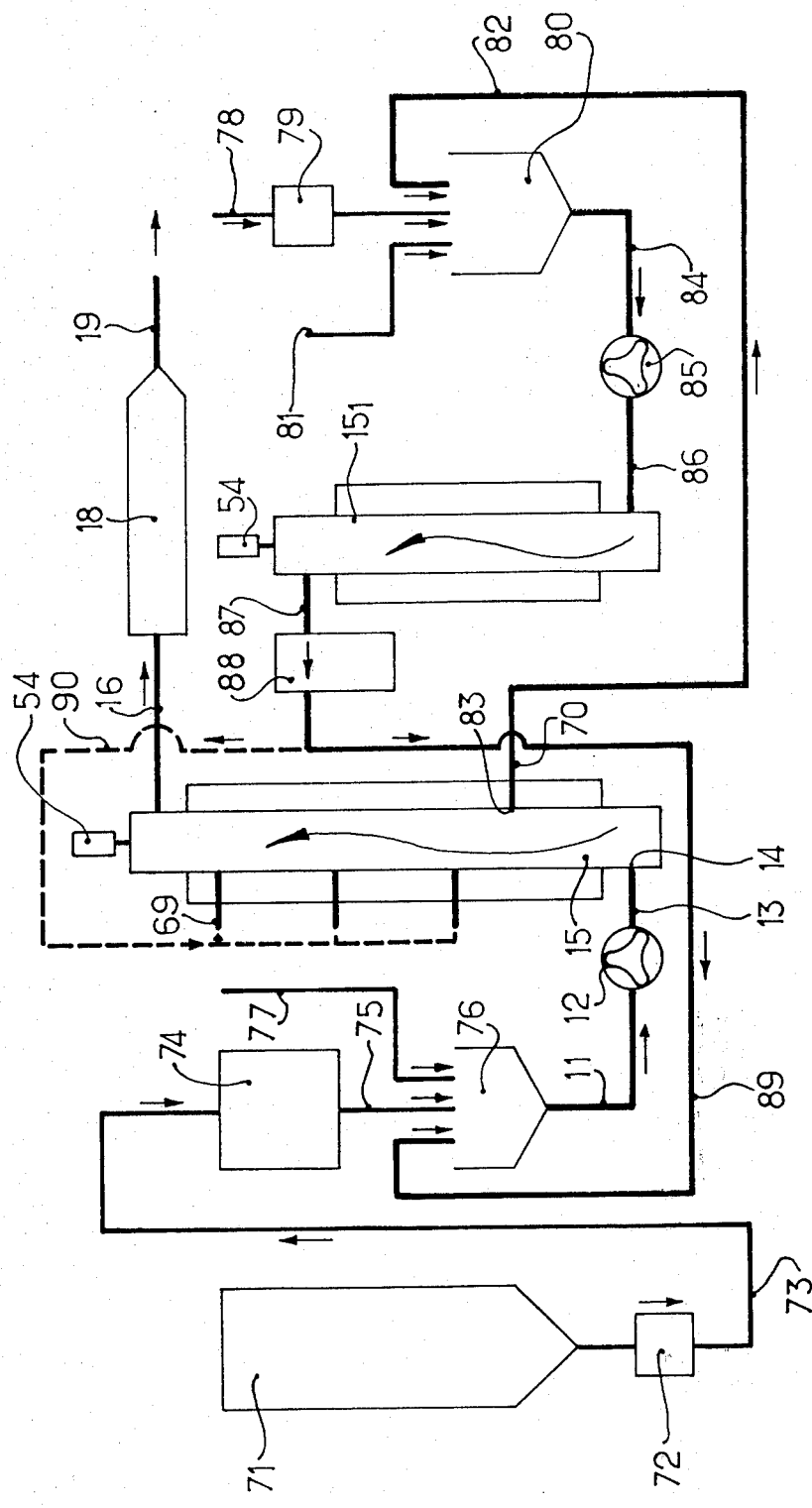
FIG. 2 is a diagram of an apparatus in accordance with another variant of the process in which the unmalted grains undergo to prior treatment before joining the malt mash for joint final treatment, this variant using two reactors of the same design.

Let us now refer to FIG. 2.

In the conventional processes, the malt and the unmalted grains are treated separately. The treatment for the malt consists of the crushing operations, the mixing of the water and the crushed malt, and the mashing proper. The malt which is stored in a bin 71 is first of all weighed on a scale 72 and then passed by any type of conveying 73 to a mill 74. This mill 74 makes it possible to obtain a particle size by crushing of the malt such that one can regulate the size of the husks and obtain a very high percentage of flour. Through a conduit 75, the crushed malt is directed towards a vat 76. Water is introduced into this vat 76 through a conduit 77. The malt flour and the water are mixed in this vat 76. This mixing is effected at a temperature which favors the activity of the beta-glucanases and the proteases. The water-malt mixture, known as "mash", is pumped by the mash pump 12 through the conduit 11. This mash pump 12 introduces the mash via the conduit 13 into the continuous mashing reactor 15 as described below and shown in FIG. 3.

In parallel with the mashing operation, the unmalted grains are subjected to a separate treatment. The unmalted grains, which as already indicated may be corn, rice, barley or the like, are supplied through a conduit 78 and are weighed on a scale 79 and fall into a mixing vat 80. Into this vat 80 mixing water is introduced through a conduit 81 and, through a conduit 82, a fraction of the malt mash 83 taken from the continuous mashing reactor 15 at a variable point, employing either the connection 69 or the connection 70. The entire mixture formed of the crushed unmalted grains, the mixing water and a fraction of malt mash is directed via a conduit 84 from the vat 80 to a pump 85 which introducing this mixture, via a conduit 86, into a second continuous mashing reactor $15_1$ which is practically identical to the reactor 15 which has been described above. Of course this second reactor $15_1$ has the same parts as the reactor 15, in particular the agitator 51 driven by the motor 54.

The mash of unmalted grains emerges from the reactor $15_1$ at the point 87, passes through a heat exchanger 88 and returns via a conduit 89 into the mixing vat 76. A tap 90 is provided on the conduit 89. Thus the mash of unmalted grains which emerges from the heat exchanger 88 can also be injected into the malt reactor 15 at different temperatures varying between 35° C and 80° C depending upon the enzymatic state of the malt and the desired composition of the malt, the points of entrance into the reactor 15 being, for example, the connections 69 or 70.

The combination of the malt and unmalted grain mashes coming from the mixing vat 76 is pumped into the reactor 15 and discharges at the point 16 passing to the filtration apparatus 18 assuring the separation operation continuously and one obtains the wort 19.

In accordance with the known processes, the unmalted grain mash is mixed with a small proportion of the malt mash, of the order of 5 to 25%, which permits a certain enzymatic activity which is absent in the unmalted grains. This unmalted grain mash is also subjected to an increase in temperature which occurs with definite pauses. The first pulse occurs at between 75° C and 85° C and is known as the doughing or gelatinization pause; the second pause takes place at 100° C and its purpose is to hydrolyze the starch paste.

However, due to the inclusion of the reactor $15_1$ the increase in temperature can be progressive and the aforementioned pauses eliminated. The mash of hydrolyzed unmalted grains can be cooled to a temperature of from 35° C to 50° C and mixed again with the crushed malt to which water has been added. At these temperatures of 35° C to 50° C the activity of the beta-glucanases and of certain proteases takes place.

It should be noted that both for the treatment of the malt mash and for the separate treatment of the unmalted grain mash one can use a progressive increase in temperature which differs from the system of temperature pauses applied in all the conventional mashing methods. Thus in the case of the malt mash, the progressive rise in temperature in the reactor 15 ranges from about 30° C to about 80° C and, in the case of the unmalted grain mash, the progressive rise in temperature in the second reactor $15_1$ extends from about 30° C to about 100° C. These rises may have time-temperature characteristics either of a straight line or of a series of curves whose shapes are calculated on the basis of data concerning the degradation of the protein materials and of the glucide compounds.

Figure 3:
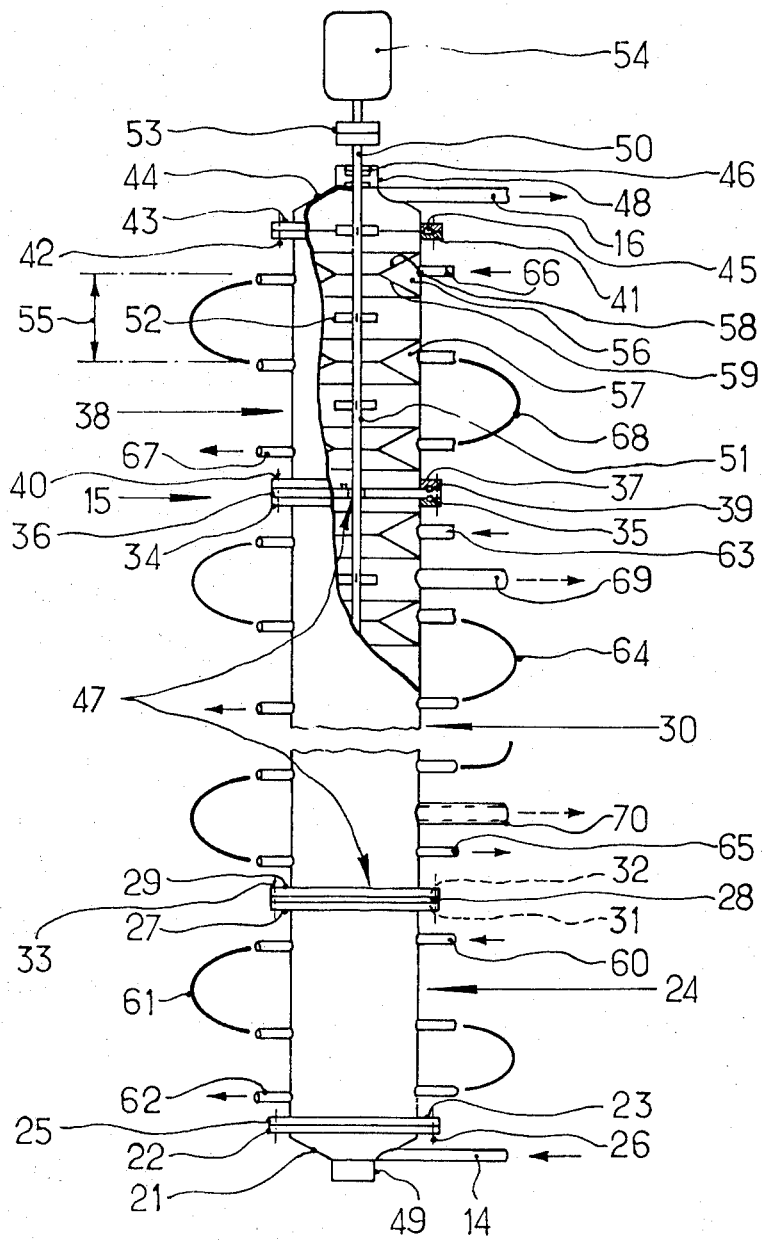
FIG. 3 is a schematic section in elevation of a continuous mashing reactor in accordance with the invention and for purposes of clarity the details of the parts in profile have been indicated schematically.

Reference is now had to FIG. 3.

The vertically arranged continuous mashing reactor 15 may be composed of several sections. The first section forms the bottom 21 provided with the mash inlet connection 14. At its upper part the first section 21 has a flange 22 which is connected to the lower flange 23 of the second section 24. A gasket 25 assures the tightness between the flanges 22 and 23 which are held connected together by any suitable fastening element 26. The second section 24 comprises at its upper portion a second flange 27 on which there is placed a guide flange 28 serving as connecting element between the flange 27 of the second section and a lower flange 29 of the third section 30. Gaskets 31, 32 assure tightness between, on the one hand, the flange 27 of the second section 24 and the guide flange 28 and on the other hand between the guide flange 28 and the lower flange 29 of the third section 30. Fastening elements 33 assure the connection between the second and third sections 24, 30.

This third section 30 is provided at its upper portion with a second flange 34 provided with a gasket 35 on which there is placed a second guide flange 36. Between this guide flange 36 and a lower flange 37 of a fourth section 38 there is provided a gasket 39, fastening elements 40 assuring the connection between the third section 30 and the fourth section 38. This fourth section 38 comprises at its upper portion a flange 41 which is connected by fastening elements 42 to a flange 43 rigidly connected with the fifth section 44, a gasket 45 assuring tightness.

The fifth section 44 which constitutes the cover of the reactor 15 is provided with the outlet conduit 16. The cover 44 has rotating sealing joints 46. Through these joints 46 and through the guide flanges 28 and 36 provided with guide bearings 47 there is arranged a shaft 50 of an agitator 51 provided with blades 52. This shaft 50 is connected via a clutch 53 to a drive motor 54.

The sections 24, 30 and 38 are divided into and define a series of mashing cells or chambers 55 to assure hydrodynamically the advantageous conditions of a breaking down of the process into several stages.

The heating of the reactor is assured by a plurality of thermostatic heating jackets or pockets 56, 57 connected together by sections in the particular case shown in the figure. The pockets 56, 57 may for instance be of triangular cross section two sides of which complement the outer shape of adjoining chambers so as to permit an increase in the heating surface. One obtains a heating system whose heat gradient between the heating wall 58, 59 and the mash is very small. This technique makes it possible to preserve the enzymatic potential of the mash, that is to say the quality and the quantity of the enzymes. This difference in temperature between the heating fluid and the substrate is not more than a few degrees Centigrade. The pockets 56, 57 are interconnected by a series of connections to enable circulation of a heating medium. Thus for the second section 24 the heating fluid can enter through the connection 60, flow through the pockets of successive cells 55 due to connecting bridges 61 between the pockets 56 and re-emerge through the connection 62 passing to the heating fluid feed tank, not shown. Similarly, in the case of the third section 30 the heating fluid can enter through the connection 63, flow in the connection bridges 64 and emerge through the connection 65. In the case of the fourth section 38, the introduction takes place through the connection 66 and the departure through the connection 67, the connecting bridges 68 assuring the transfer of the heating fluid from one pocket to the other. At different points along the reactor 15, connections 69, 70 are provided making it possible to remove or to again return mash for the requirements, for instance, of steeping.

The temperature of each section 24, 30 and 38 is controlled to assure a progressively increasing temperature of the mash. Thus the section 24 has a temperature zone located between 35° C and 50° C, the temperature of 50° C being at the top part of this section 24 and the temperature of 35° C at the bottom part. The section 30 has a temperature zone of between 50° C and 65° C, the temperature of 65° C being at the top portion of this section 30 and the temperature of 30° C at the bottom portion, while the section 38 has a temperature zone of between 65° and 80° C, the temperature of 80° C being at the top of this section 38 and the temperature of 65° C at the bottom. Due to this arrangement the mash is subjected to a progressive increase in temperature going from about 30° C to about 80° C within a period of time of the order of 1 hour.

In the apparatus of the type described, composed of communicating cells in series, traversed continuously by a mechanically agitated fluid, the passage of fluid material from one cell to the following cell is in practice frequently the result of convective movements in both directions as depicted by the arrows Q, and Q2 in FIG. 7. This phenomenon is sometimes referred to as "back mixing" and it is particularly substantial when the agitation is vigorous and the transfer between cells geometrically and hydronamically unconstrained.

This phenomenon presents drawbacks in general, particularly for mashing, namely:

Leveling out of the different elements of the transformation potential of the materials treated (tendency towards uniformity, along the reactor, of the extract content of the liquid, for instance).

Loss of a part of the benefit theoretically obtainable by the use of cells in series — the narrowing of the distribution of the times of stay (at the different thermal and biochemical stages) is less than in the ideal case; this results in a poored homogeneity of the series of transformation conditions suffered by the mash and therefore of the exposure of a part thereof to treatments which are vary different from the optimum treatment which can be imposed only on an average average.

Due to the random forward and return motions superimposed on the net flow, exposure of enzymatic fractions to harmful overheating before they have entirely completed the biochemical transformations contemplated.

It has been mentioned that the mashing at three separate temperature pulses is not a necessity and that in fact the complex assembly of enzymatic transformations staggered over the sequence of temperatures passes through upon the mashing gives substantially equivalent results for an appreciable variety of thermal diagrams possible within a given time interval.

It is this character of the optimum treatment process which permits the success of continuous manufacture despite the drawbacks mentioned but it is obvious that the yield suffers from excessive dispersion of the treatments imposed on the different unit volumes of mash, particularly if the subsequent exchanges between them can only in part attenuate the consequences of this dispersion.

This dispersion may be contained within acceptable limits by reducing the back-mixing by one or more of the following means:

Constricting the passage from each cell to the following cell (subject to modifying the construction to permit the mounting of the agitator); this effect, as has been stated, can be obtained without drawback and becomes more effective the larger the flows used;

Reduce the intensity of agitation of the minimum tolerable.

Install between the cells a device which favors the transfer of material in the direction imposed upon the reactor or even excluding the passage of material in the opposite direction.

As seen in the embodiment of FIGS. 4–6, the passage 91 from each cell 55$_1$ to the following 55$_2$ is constricted and the intensity of agitation reduced to a tolerable minimum. Moreover, one can further install between the cells 55$_1$ 55$_2$ at the place of the constriction 91 a flow control device which favors the transfer in the direction imposed on the reactor 15 or even excluding material flow in opposite direction.

In accordance with a first embodiment shown in FIG. 4, this flow control device may be a screw or propeller 92 mounted on the shaft 50 of the agitator 51. This screw or propeller 92 creates a pumping effect adapted to the imposed rate of flow of the reactor 15.

In accordance with a second embodiment shown in FIG. 5 this flow control device is formed by a nonreturn or one-way valve 93 placed between the cells 55$_1$, 55$_2$. This valve 93 can for instance consist of a flexible diaphragm of disk 94 having a hole at its center 95 to permit the passage of the shaft 50 of the agitator 51. This flexible diaphragm or disk 94 rests on the periphery of the constriction 91 and is held in place by a ring 96 rigidly connected with the shaft 50. Under the thrust exerted by the mash in the direction indicated by the arrow "A", the diaphragm or disk 94 flexes, permitting the passage of the mash in a single direction. On the other hand, in the opposite direction, the mash would tend to seat the diaphram or disk 94 against the periphery of the constriction 91 thereby closing constriction and preventing flow in the reverse direction, i.e. opposite that indicated by the arrow "A".

As the mashing involves, inter alia, exchanges between liquid and particles in suspension it is necessary to combat the settling which tends to impair the condition for this exchange and which may even go so far as to choke the reactor.

In addition to its role of contributing to the mass transfers between particles and liquid and assisting in the heat transfer, the agitation has the object of opposing settling and the hydrodynamic conditions and the characteristics of the suspension to be used in order to achieve this in general, and semi-quantitative fashion are known.

In this connection one notes however certain drawbacks, namely:

the reduction of the size of the particles hampers the subsequent separation.

the back-mixing is accentuated by the increase in the agitation.

It is proposed to limit these drawbacks by the following means:

Narrowing the particle size histogram of the particles by recourse to a dry grinding in several passages with intermediate screening and recycling. In this way, as the size of the fines which interfere with the filtration and that of the coarse particles which impose an intense agitation which is harmful in other respects approach each other, the said drawbacks are reduced.

Adopt a cell configuration which prevents choking with a minimum amount of agitation FIG. 6 shows one embodiment of cells comprised of profiled chambers $55_1$, $55_2$, for instance of pear or teardrop shape, so as to inflect towards the vertical direction centrifugal movements produced by the rotary agitator 51. The blades 52 in each cell $55_1$, $55_2$ are located at the bottom of each cell within the zone 97 where the stagnant depositing of particles would have a tendency to take place therefor—.

The movement of the liquid in the reactor is composed of a net movement (imposed flow) and turbulent movements. The particles following the movement of the liquid approach each other to a certain extent which is less the heavier they are and in the case of turbulence of shorter time duration.

The movement of the particles furthermore comprises a slow downward component (settling) the consequences of which are more or less completely effaced by the agitation and the rate of which, by a suitable selection of the particle size and of the cross section of the reactor, may be of an order comparable to the net speed of the mash in the cell, which is imposed by the rate of flow.

This can be utilized to assure the particles a longer time of stay in the reactor than the time of stay of the liquid, particularly as they are heavier and require a longer time of treatment.

In order to achieve this effect which is advantageous both for the duration and for the exhaustiveness of the mashing, the following means are employed Circulate the mash upward in the reactor;

Obtain an equilibrium between the factors which favor settling (particle size, for instance) and those which oppose it (agitation and the ascending speed of the mash, for instance) such that there remains a residual settling effect which does not go so far as to result in total stagnation of the heavier particles. This is possible approximately at the time of the design of the apparatus based on the theory of suspensions and can be refined by identification in operation of the values of operating conditions which best produce this effect in a given installation.

The output of the mashing operation and that of the downstream separation are functions of the initial solid/liquid ratio. Moreover, the finished wort must satisfy a requirement of minimum density. Due to the characteristics inherent in the system proposed, the optimum distribution of the total water between that introduced at the inlet and that used for the sparging of the spent grains may be different from that which is imposed in batch operations; it may also be different in continuous operation depending on whether one operates upward or downward in the reactor and in particular downward using a finer crushed malt, a more dilute mash and less sparging water than in conventional mashing for a wort of given density.

In order to improve this optimum it has been found useful to recycle the last sparging liquors, either to the preceding separation stage or to the mashing.

When this recycling is applied to the mashing, it may usefully be effected towards the end of the proteolysis operation, with the following advantages;

Dilution of the mash favorable to the amylolysis while it would be harmful to the proteolysis, which is better done in thick mash.

Displacement of the pH in a direction favorable to the amylolysis the requirements of which in this respect are different from those of the proteolysis.

Contribution to the development of the temperature of the mash in the reactor.

Minimum disturbance of the extraction potential by introducing the sparging liquor at a stage where the mash has reached a density of the same order as that of these liquors.

It has been found that a part of the transformations due to the proteases and beta-glucanases could usefully be carried out in the mixer, upstream of the reactor, with a temperature of the order of 35° C to 45° C in this apparatus.

We claim:

1. In a process of continuous mashing for producing mash in the production of beer, the steps of: continuously providing a mash mixture of malt and raw grains mixed with water; passing said mash mixture through a reactor in a continuous manner to produce mash; heating said mash mixture during its passage through the reactor to progressively raise the temperature therefor at a substantially constant temperature gradient thereby preserving the enzymatic potential of the mash mixture constituents throughout the length of the reactor; and agitating said mash mixture during its passage through the reactor to promote the extraction and diffusion of the active mash mixture constituents and prevent overheating of said mash mixture.

2. A process according to claim 1; wherein said passing and agitating steps are carried out so as to reduce countercurrent flow of the mash within the reactor.

3. A process according to claim 1; wherein said passing step comprises passing said mash mixture upwardly through the reactor so as to utilize the tendency of the mixture particles to settle to thereby obtain a longer dwelling time for the particles than for the liquid; and controlling said passing and agitating steps to establish a controlled balance between the settling and ascending of the particles to thereby obtain an average upward speed of ascent of the particles which is less than that of the liquid.

4. A process according to claim 1; wherein said heating step comprises heating said mash mixture from approximately 30° C at the reactor inlet end to approximately 80° C at the reactor outlet end at a substantially constant temperature gradient throughout the length of the reactor.

5. A process according to claim 1; including pretreating raw grains in a separate reactor according to the treating process set forth in claim 1; and adding the pretreated raw grain mixture to said mash mixture at a given location during its passage through said reactor.

6. A process according to claim 1; further including adding a washing liquor to said malt mixture at at least one location in said reactor to thereby permit proteolysis, in a thick phase, and amylolysis, in a diluted phase.

7. A mash reactor comprising: means defining a plurality of chambers arranged vertically and connected together in serial flow relationship with one end chamber having an inlet for receiving a mash mixture and the other end chamber having an outlet for discharging the mash; agitating means extending axially through said chambers and having means located in the vicinity where adjoining chambers are connected together for assisting and promoting flow of the mash mixture in a forward direction through the reactor; and heating means for heating the mash mixture to progressively raise the temperature thereof at a substantially constant temperature gradient during flow of the mash mixture through the reactor.

8. A mash reactor according to claim 7; wherein said heating means includes heating jackets surrounding the outer walls of at least some of said chambers, and means for circulating a heating medium through said heating jackets in a controlled manner to establish said substantially constant temperature gradient.

9. A mash reactor according to claim 8; wherein said heating jackets have a generally triangular cross-section two sides of which complement the outer shape of adjoining chambers which they surround thereby providing large heat-exchange surfaces.

10. A mash reactor according to claim 7; wherein said heating means includes means for heating the mash mixture from approximately 30° C at the inlet end of the reactor to approximately 80° C at the outlet end thereof.

11. A mash reactor according to claim 7; wherein said agitating means includes a rotary shaft extending axially through said chambers, and a set of agitating blades connected to said shaft within each chamber and extending radially outwardly thereof and being located at the upstream end of the chambers.

12. A mash reactor according to claim 7; including constricted passages interconnecting adjoining chambers; and wherein said agitating means includes a rotary shaft extending axially through said chambers and said constricted passages, said shaft having helical screw sections located in said constricted passages for assisting and promoting flow in said forward direction in response to rotation of said shaft, and means for rotationally driving said shaft.

13. A mash reactor according to claim 7; wherein said agitating means includes a rotary shaft extending axially through said chambers, and a plurality of one-way valves connected to said shaft and each located in the vicinity where two adjoining chambers are connected together for permitting flow in said forward direction and effectively preventing flow in the reverse direction.

14. A mash reactor according to claim 13; where each one-way valve comprises a flexible valve member mounted on said shaft.

15. A mash reactor according to claim 1; wherein said chambers have a generally teardrop configuration.

* * * * *